United States Patent
Sundaresan et al.

(10) Patent No.: US 10,853,852 B2
(45) Date of Patent: Dec. 1, 2020

(54) SYSTEM AND METHOD FOR PROVIDING LISTING ASSISTANCE

(71) Applicant: eBay Inc., San Jose, CA (US)

(72) Inventors: Neelakantan Sundaresan, Mountain View, CA (US); Nam Do, Hanoi (VN); Andrew Yee, Allston, MA (US)

(73) Assignee: eBay Inc., San Jose, CA (US)

( * ) Notice: Subject to any disclaimer, the term of this patent is extended or adjusted under 35 U.S.C. 154(b) by 97 days.

(21) Appl. No.: 15/913,627

(22) Filed: Mar. 6, 2018

(65) Prior Publication Data
US 2018/0197213 A1    Jul. 12, 2018

Related U.S. Application Data

(63) Continuation of application No. 13/544,598, filed on Jul. 9, 2012, now abandoned, which is a continuation of application No. 13/091,904, filed on Apr. 21, 2011, now Pat. No. 8,229,794.

(60) Provisional application No. 61/327,041, filed on Apr. 22, 2010.

(51) Int. Cl.
*G06Q 30/00* (2012.01)
*G06Q 30/02* (2012.01)
*G06Q 30/04* (2012.01)

(52) U.S. Cl.
CPC ......... *G06Q 30/0283* (2013.01); *G06Q 30/04* (2013.01)

(58) Field of Classification Search
None
See application file for complete search history.

(56) References Cited

U.S. PATENT DOCUMENTS

| 8,229,794 | B2 | 7/2012 | Sundaresan et al. | |
|---|---|---|---|---|
| 2005/0102189 | A1 | 5/2005 | Lopez et al. | |
| 2007/0299743 | A1* | 12/2007 | Staib | G06Q 10/107 |
| | | | | 705/7.33 |
| 2008/0222003 | A1* | 9/2008 | Adstedt | G06Q 10/087 |
| | | | | 705/26.81 |
| 2010/0017259 | A1* | 1/2010 | Luo | G06Q 30/0603 |
| | | | | 705/7.35 |
| 2010/0082410 | A1 | 4/2010 | Baudin et al. | |
| 2010/0250337 | A1* | 9/2010 | Kassaei | G06Q 20/108 |
| | | | | 705/70 |
| 2010/0312665 | A1* | 12/2010 | Bundy | C08K 3/36 |
| | | | | 705/26.8 |
| 2011/0093352 | A1* | 4/2011 | Sarmiento | G06Q 30/00 |
| | | | | 705/26.1 |

(Continued)

OTHER PUBLICATIONS

Non-Final Office Action received for U.S. Appl. No. 13/091,904, dated Oct. 13, 2011, 8 pages.

(Continued)

*Primary Examiner* — Mila Airapetian
(74) *Attorney, Agent, or Firm* — Faegre Drinker Ebay

(57) ABSTRACT

In various example embodiments, a system and method for providing listing assistance to a user for generating an item listing is provided. In example embodiments, user input is received from a device of the user. Information regarding item listings that correspond to the user input is accessed. Statistic data is generated using the accessed information. The statistic data is provided for display to the device of the user for generating the item listing.

20 Claims, 10 Drawing Sheets

(56) References Cited

U.S. PATENT DOCUMENTS

2011/0264561 A1   10/2011  Sundaresan et al.
2014/0012693 A1   1/2014   Sundaresan et al.

OTHER PUBLICATIONS

Notice of Allowance received for U.S. Appl. No. 13/091,904, dated Mar. 26, 2012, 8 pages.
Response to Non-Final Office Action filed Jan. 13, 2012 for U.S. Appl. No. 13/091,904, dated Oct. 13, 2011, 8 pages.
Advisory Action received for U.S. Appl. No. 13/544,598, dated Mar. 10, 2015, 5 pages.
Appeal Brief for U.S. Appl. No. 13/544,598, filed Apr. 1, 2016, 39 pages.
Examiner's Answer to Appeal Brief received for U.S. Appl. No. 13/544,598, dated Aug. 29, 2016, 11 pages.
Final Office Action received for U.S. Appl. No. 13/544,598, dated Dec. 2, 2015, 10 pages.
Final Office Action received for U.S. Appl. No. 13/544,598, dated Dec. 16, 2014, 5 pages.
Final Office Action received for U.S. Appl. No. 13/544,598, dated Jul. 23, 2013, 10 pages.
Non-Final Office Action received for U.S. Appl. No. 13/544,598, dated Jan. 29, 2013, 8 pages.
Non-Final Office Action received for U.S. Appl. No. 13/544,598, dated Jul. 14, 2014, 11 pages.
Non-Final Office Action received for U.S. Appl. No. 13/544,598, dated Jun. 25, 2015, 10 pages.
Reply Brief for U.S. Appl. No. 13/544,598, filed Oct. 31, 2016, 8 Pages.
Response to Final Office Action and Advisory Action filed Apr. 16, 2015 for U.S. Appl. No. 13/544,598, dated Dec. 16, 2014 and Mar. 10, 2015, 30 pages.
Response to Final Office Action filed Feb. 17, 2015, for U.S. Appl. No. 13/544,598, dated Dec. 16, 2014, 24 pages.
Response to Final Office Action filed Nov. 25, 2013, for U.S. Appl. No. 13/544,598, dated Jul. 23, 2013, 10 pages.
Response to Non Final Office Action filed Oct. 14, 2014, for U.S. Appl. No. 13/544,598, dated Jul. 14, 2014, 17 pages.
Response to Non Final Office Action filed Sep. 25, 2015, for U.S. Appl. No. 13/544,598, dated Jun. 25, 2015, 19 pages.
Response to Non-Final Office Action filed Apr. 29, 2013, for U.S. Appl. No. 13/544,598, dated Jan. 29, 2013, 10 pages.
Eagan et al., "Spiders and Worms and Crawlers,Oh My: Searching on the World Wide Web", Retrieved from the Internet URL:<http://misc.library.ucsb.edu/untangle/eagan.html>, Apr. 26, 1996, 2 pages.

\* cited by examiner

SYSTEM AND METHOD FOR PROVIDING LISTING ASSISTANCE

CROSS-REFERENCE TO RELATED APPLICATIONS

This application is a continuation of U.S. patent application Ser. No. 13/544,598, filed Jul. 9, 2012, which is a continuation of U.S. patent application Ser. No. 13/091,904, filed Apr. 21, 2011 (issued as U.S. Pat. No. 8,229,794), which claims priority to U.S. Provisional Application No. 61/327,041, filed Apr. 22, 2010. Each of the aforementioned applications is herein incorporated by reference in its entirety.

TECHNICAL FIELD

The present disclosure relates generally to publication systems, and in a specific example embodiment, to providing listing assistance for creating a publication for the publication system.

BACKGROUND

When creating a publication for inclusion in a publication system, a user is often unsure as to what information to include in the publication. For an example whereby the publication is a listing of an item for sale on an auction system, the user may wonder what a good description, starting bid price, or shipping cost may be for the listing. The user may perform multiple searches of the auction system to find current listings for the same or similar items and see what other users have done. However, the multiple searching and comparison process is time consuming and may be inaccurate.

BRIEF DESCRIPTION OF THE DRAWINGS

Various ones of the appended drawings merely illustrate example embodiments of the present invention and cannot be considered as limiting its scope.

DETAILED DESCRIPTION

Figure 1:
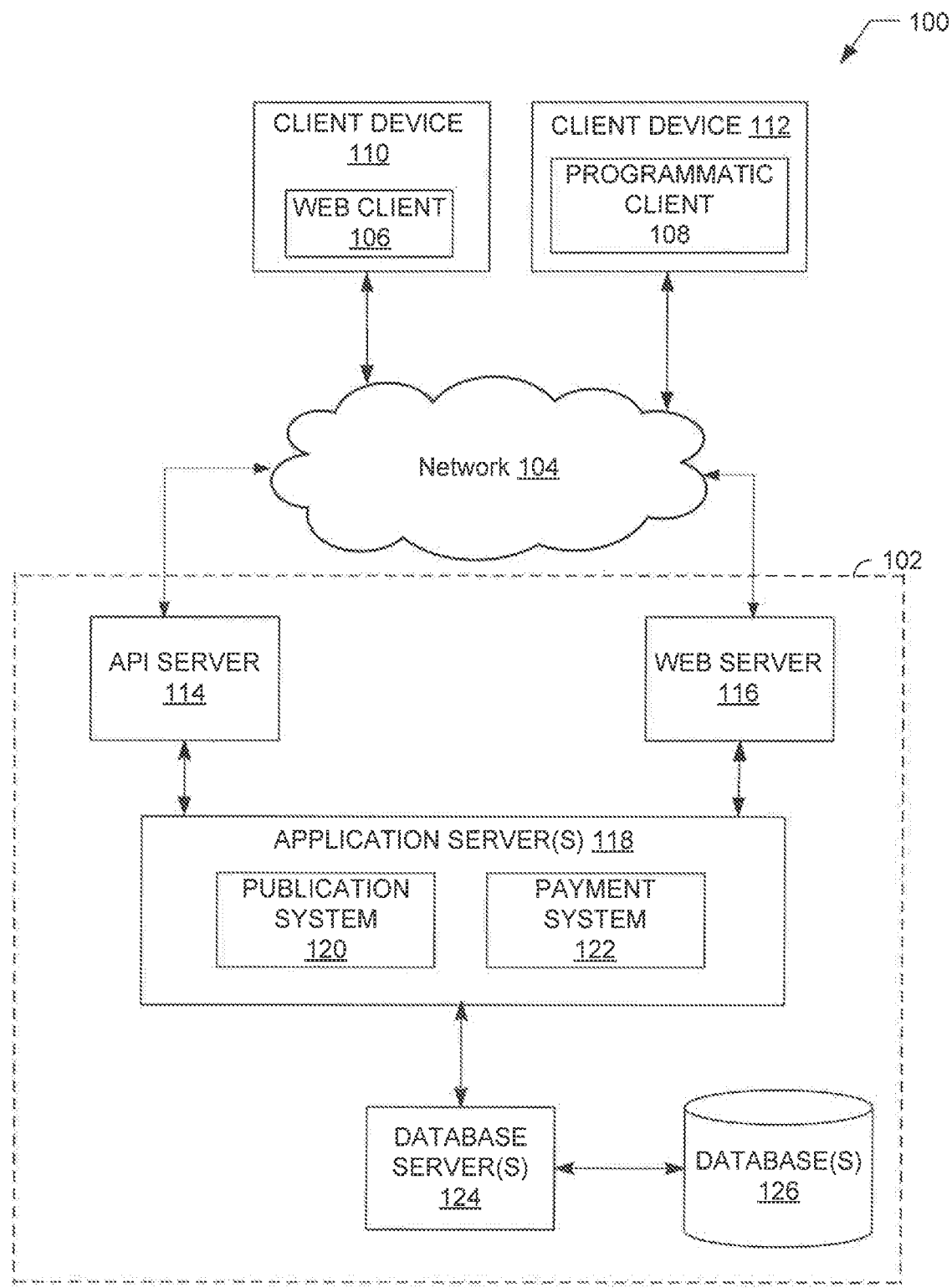
FIG. 1 is a block diagram illustrating an example embodiment of a network architecture of a system used to identify items depicted in images.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that, embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication environment, the embodiments are given merely for clarity in disclosure. Thus, any type of electronic, publication, electronic commerce, or electronic business system and method, including various system architectures, may employ various embodiments of the publication system and method described herein and be considered as being within a scope of example embodiments. Each of a variety of example embodiments is discussed in detail below.

Example embodiments described herein provide systems and methods for providing listing assistance to a user. In example embodiments, a query is received from a device of the user. Information from a category that corresponds to the query is retrieved. The category may be a product category that is identified based on a product identifier number and a product identifier type. In one embodiment, a plurality of publications is accessed which include item listings from a networked marketplace. Statistic data is generated using the information from the category that corresponds to the query. The statistic data may include one or more of a minimum selling price, a maximum selling price, an average selling price, a median selling price, an average shipping price, an average Buy It Now price. The statistic data may also comprise counts (e.g., percentage and number of publications) directed to immediate payment availability, best offer availability, Buy It Now availability, listing types used, and shipping methods used. The statistic data is provided to the device of the user for display on a user interface. The user may use the statistic data to aid the user in determining type of information and options to be included in a new publication generated by the user.

By using embodiments of the present invention, a user creating a publication can easily and quickly determine what information the user may want to include in their publication without having to continually perform searches for similar publications from which to model their publication. Accordingly, one or more of the methodologies discussed herein may obviate a need for additional searching on a networked system, which may have the technical effect of reducing computing resources used by one or more devices within the system. Examples of such computing resources include, without limitation, processor cycles, network traffic, memory usage, storage space, and power consumption.

With reference to FIG. 1, an example embodiment of a high-level client-server-based network architecture 100 to provide content based on an image is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash. State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client devices 110 may comprise or be connectable to an image capture device (e.g., camera). The client device 110 may also comprise one or more of a voice recognition module (not shown) to receive audio input, a touchscreen to receive tactile input, an accelerometer, GPS, or a display module (not shown) to display information (e.g., in the form of user interfaces).

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store publication data or user account information.

The publication system 120 publishes content on a network (e.g., Internet). As such, the publication system 120 provides a number of publication and marketplace functions and services to users that access the networked system 102. The publication system 120 is discussed in more detail in connection with FIG. 2. In one embodiment, the publication system 120 is associated with a marketplace environment (e.g., auction system, online store). It should be noted that embodiments of the present invention may be applicable to non-marketplace environments.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal, or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
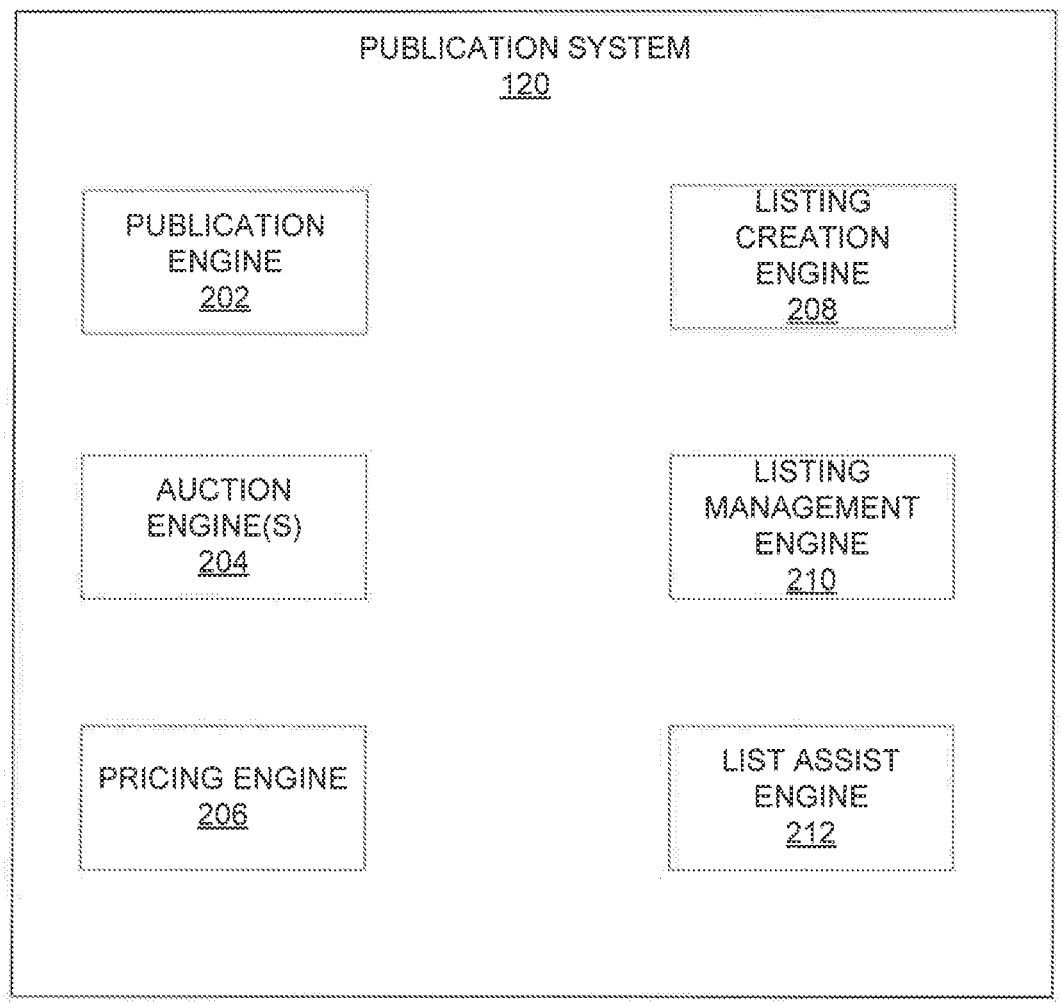
FIG. 2 is a block diagram illustrating an example embodiment of a publication system.

Referring now to FIG. 2, an example block diagram illustrating multiple components that, in one example embodiment, are provided within the publication system 120 of the networked system 102 (see FIG. 1) is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price-setting mechanisms whereby a seller may list (or publish information concerning) goods or services for sale in a publication (also referred to as a "listing"), a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double. Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

In other embodiments, the publication system 120 is directed to providing general information to a user. In these embodiments, the publication system may comprise a collection of websites and associated data repositories. For simplicity, the description of example embodiments is presented with reference to a networked marketplace. However, it will be understood that embodiments may be applicable to a non-marketplace environment. As such, not all components of the publication system 120, as described herein, may be necessary.

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now! (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A listing creation engine 208 allows users to conveniently author listings of items or allows content providers to author content publications. In one embodiment, the listings pertain to goods or services that a user (e.g., a seller) wishes to transact via the publication system 120. In other embodiments, the user may create a listing that is an advertisement or other form of content publication.

A listing management engine 210 allows sellers to manage such listings. Specifically, where a particular seller has authored or published a large number of listings, the management of such listings may present a challenge. The listing management engine 210 provides a number of features (e.g., auto-relisting, inventory level monitors, etc.) to assist the seller in managing such listings.

A list assist engine 212 provides information to assist a user in creating a listing. The list assist engine 212 analyses listings for similar or same products that the user is interested in listing and determines data that may be useful for the user. The data may include, for example, a minimum selling price, a maximum selling price, an average selling price, a median selling price, average shipping cost, and an average Buy-It-Now price. The various data is returned to the user and the user may determine based on the returned data, for example, a starting price, whether to use Buy-It-Now, what shipping cost to include, or what shipping options to provide in their listing. The list assist engine 212 will be discussed in more detail in connection with FIG. 3 below.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., navigation engine, account engine, dispute resolution engine, loyalty promotion engine, personalization engines, etc.) have not been shown or discussed in detail. The description given herein simply provides a variety of example embodiments to aid the reader in an understanding of the systems and methods used herein.

Figure 3:
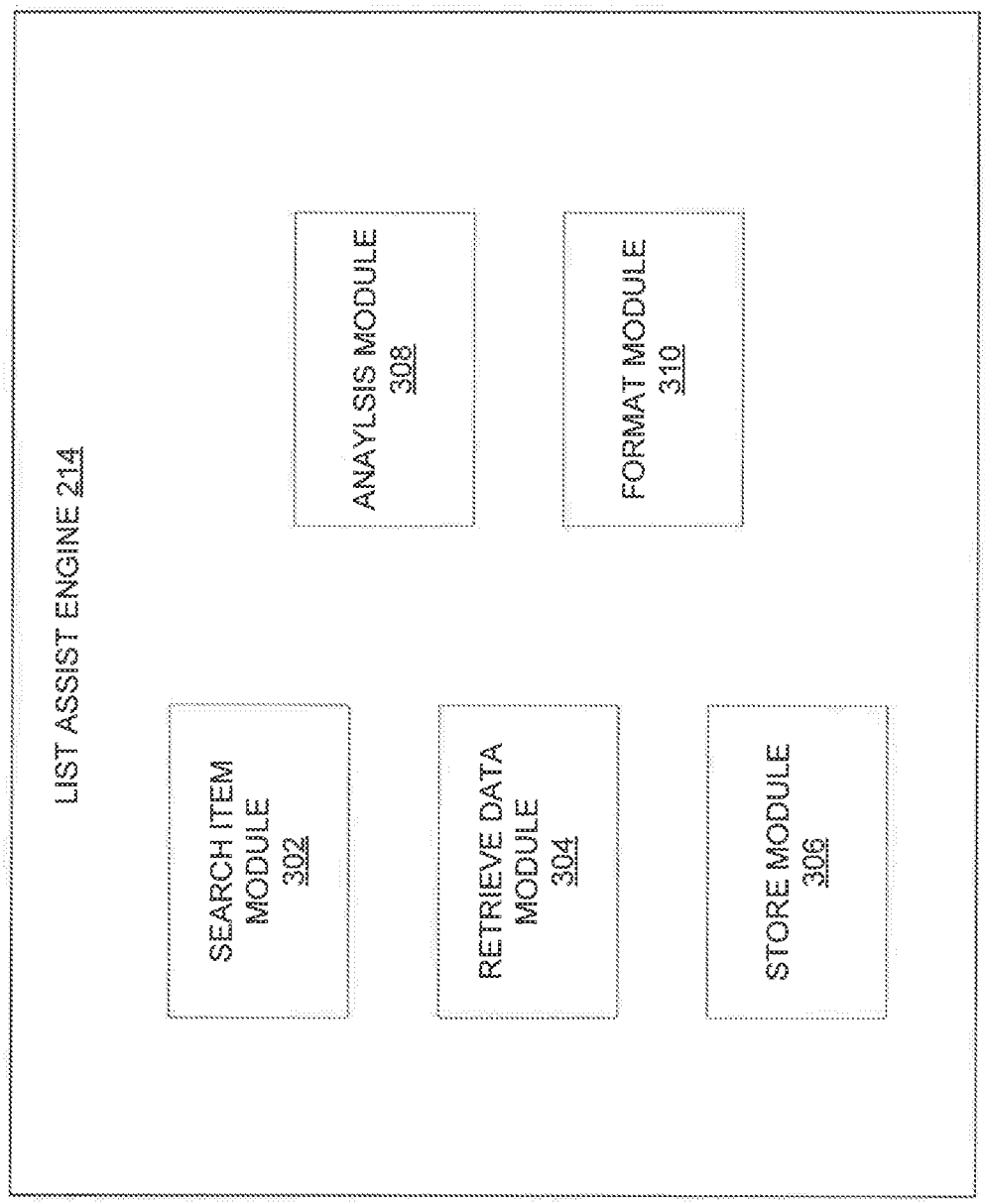
FIG. 3 is a block diagram illustrating an example embodiment of a list assist engine.

Referring now to FIG. 3, an example detailed diagram of the list assist engine 214 is shown. The list assist engine 214, alone or in combination with the listing creation engine 208, provides mechanisms to provide data that may assist a user in creating a listing for the publication system 120. In example embodiments, the list assist engine 214 gathers information from one or more databases (e.g., database 126) that store current listings for similar items/products on the publication system 120. The data is then analyzed in order to provide the user with information that may be helpful in creating the listing, in alternative embodiments, completed listings (e.g., pending listings that have expired or been transacted) may also be analyzed.

In example embodiments, the list assist engine 214 comprises a search item module 302, a retrieve data module 304, a store module 306, an analysis module 308, and a format module 310. While particular modules are presented as being embodied within the list assist engine 214, one or more of the modules may be located within the listing creation engine 208 or elsewhere in the networked system 102. Furthermore, functionalities of one or more of the list assist engine 214 may be combined within a single module, be separated between a plurality of modules, or be optional.

The search item module 302 performs an initial search to determine and present a product category list to the user. In example embodiments, a query is received from a user interface at the client device 110. The query may comprise one or more keywords for an item that the user is interested in listing on the publication system 120. The search item module 302 then searches the databases 126 for product categories that correspond to the query and returns the product category list to the client device 110.

In some embodiments, the search item module 302 is associated with a SearchItemServlet. This servlet makes a call to a publication API, which takes either a string of the keywords or a product identifier (ID) as an input and returns a list of product categories that corresponds with the keywords. In one example, the list includes up to twenty product categories, although any number of products may be returned in alternative embodiments. The returned product category list may be in an XML format whereby each product category in the returned product category list may be associated with a title, image URL, or product ID.

The retrieve data module 304 retrieves information for analysis based on a refinement request that is a selection of one of the product categories from the product category list by the user. The refinement request include a product ID, a product ID type (e.g., reference ID, ISBN, UPC, or EAN), or any other form of an identification corresponding to the selected product category. The product ID or product ID type may be used to retrieve current item listings (or information from the current item listings) on the publication system 120.

In some embodiments, the item listings may be retrieved in a paginated form. The store module 306 stores the item listings that are retrieved in the paginated form and parses the stored information to identify individual item listings. The parsed item listing may comprise variables representing different types of information. For example, variables such as current price, shipping cost, and Buy It Now! price may be stored as doubles, while options such as immediate payment, best offer, and Buy It Now! may be stored as Booleans. Enums may be created for listing type, shipping type, and selling state of various items since these variables have a set number of possible values.

The analysis module 308 determines listing assistance data to be presented to the user at the client device 110. In one embodiment, the analysis module 308 takes the retrieved data (e.g., stored parsed data) and determines a minimum and maximum selling price. The analysis module 308 may also calculate an average selling price, a median selling price, an average shipping cost, and an average Buy It Now! price based on the retrieved data. Additionally, counts of different listing formats are determined by the analysis module 308. The counts may include, for example, number of immediate and non-immediate payment listings, number of best offer and non-best offer listings, number of Buy It Now and non-Buy It Now listings, numbers of different listing types (e.g., advertisement, auctions, auctions with Buy It Now, classified ads, fixed price, or store inventory) and numbers of different shipping methods used (e.g., calculated, flat, international, free, free pickup, freight, or not specified).

The listing assistance data determined by the analysis module 308 is formatted by the format module 310 and transmitted to the client device 110 for rendering in the user interface. In one embodiment, the listing assistance data is formatted into a JSON string for transmission.

In one embodiment, the retrieve data module 304, store module 306, analysis module 308, and format module 310 may be associated with a RetrieveDataServlet. This servlet may take the received product ID or product ID type and call the publication API, which uses the product ID and product ID type to retrieve the item listings on the publication system 120. In embodiments where the item listings are returned paginated, multiple API calls may be made.

FIG. 4 are screenshots of a list assist user interface (UI) 400 for presenting listing assistance data (e.g., displayed on the client device 110) to the user. In one embodiment, the list assist UI 400 is provided using Adobe Flex. FIG. 4a illustrates an initial view of the list assist UI 400. The list assist UI 400 includes a search field 402 where the user may enter one or more keywords for their query. In the example of FIG. 4a, the user enters "Nintendo Wii" in the search field 402. Once entered, a search button 404 may be selected which will cause the query to be sent to the publication system 120. For example, the content of the search field 402 may be forwarded to the search item module 302.

In response to the query, results in the form of a product category list is returned to the client device 110 and displayed as tiles in a list portion 406. Each tile represents a product category from the returned product list and may display an image and a title. For example, a tile 408 is provided for a Nintendo Wii game console category. In one embodiment, up to twenty product categories may be displayed for a given query. The results may not be sorted by any metric and may be in any order. Alternatively, the results may be sorted by any means (e.g., alphabetically, by popularity, by relevance). The user may then select one of the tiles to obtain listing assistance data.

Figure 4A:
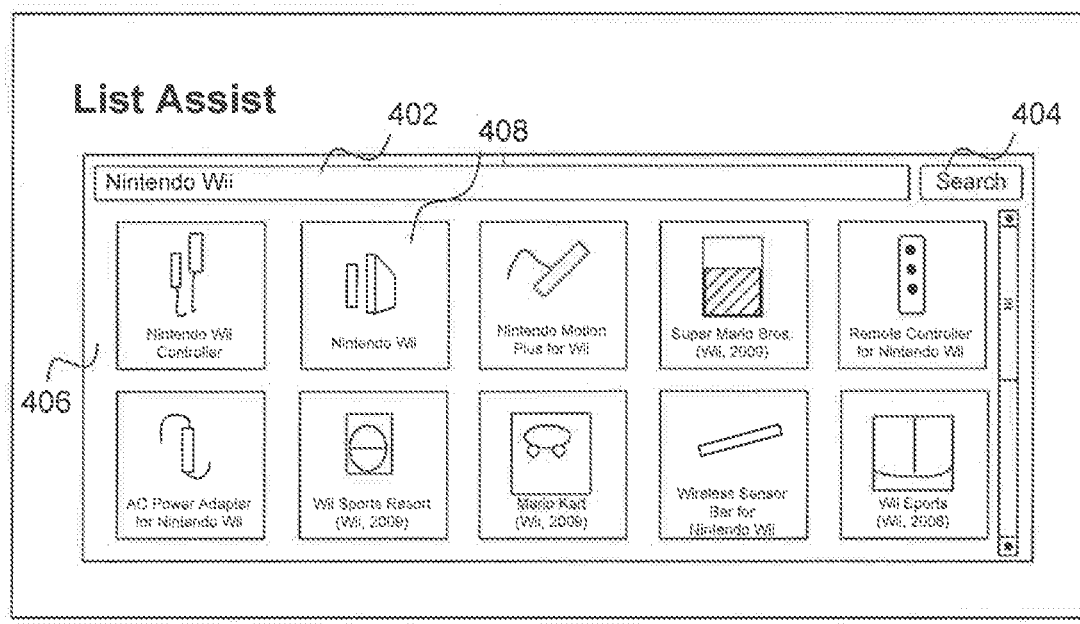
FIGS. 4A-4D are screenshots of a user interface for providing listing assistance.
Figure 4B:
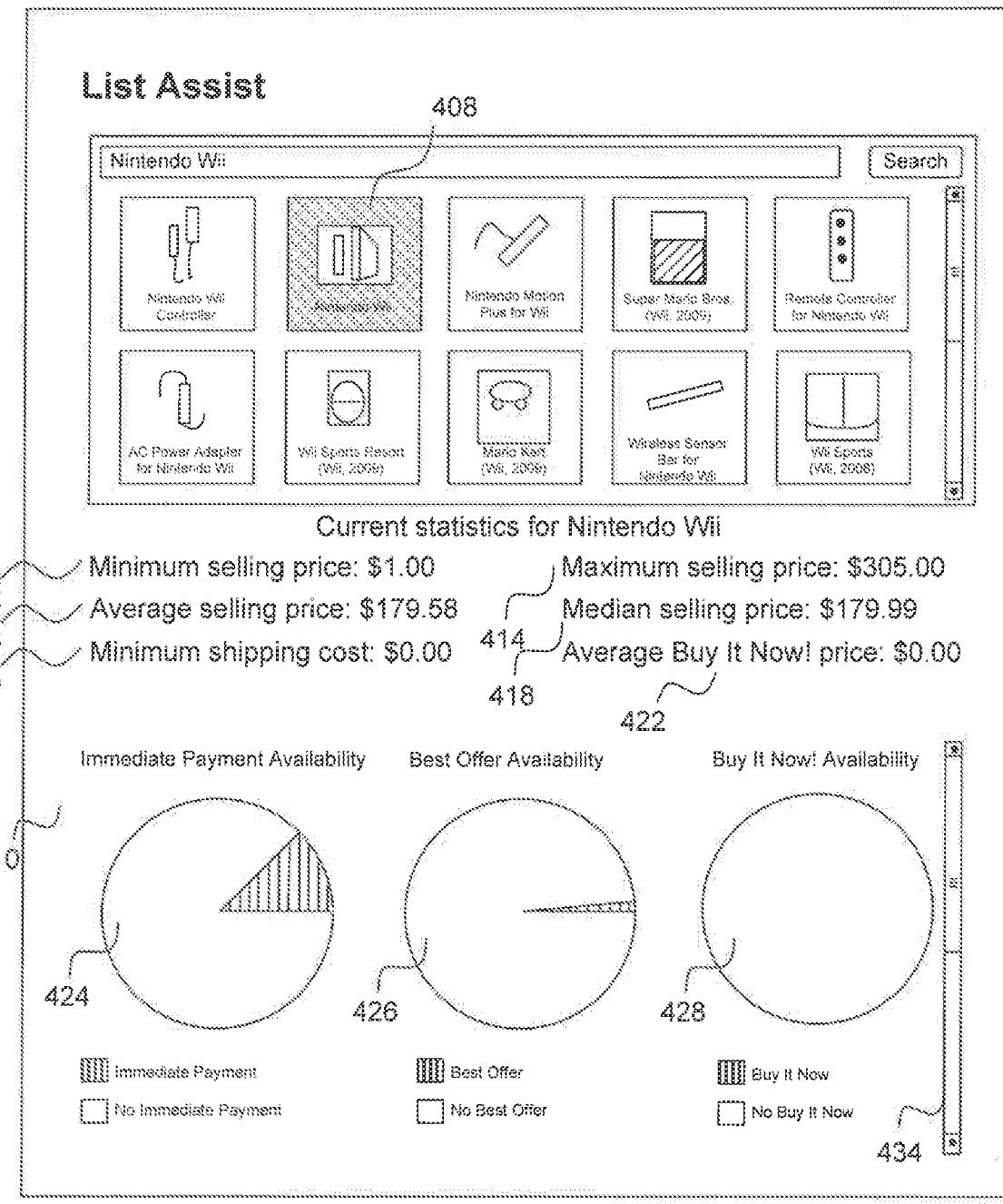

Referring now to FIG. 4b, the list assist UI 400 is expanded to include a statistics portion 410 located below the list portion 406. In example embodiments, when the user selects one of the tiles, an application of the list assist UI 400 sends a request-containing a product ID number and product ID type to the publication system 120 (e.g., retrieve data module 304). The publication system 120 retrieves information based on the request and returns data to populate the statistics portion 410. In one embodiment, the returned data is in the form of a JavaScript Object Notation (JSON) response. The application of the list assist UI 400 parses the response to extract statistics (e.g., six pricing values and data for pie charts).

In the present example, the selection of the Nintendo Wii tile 408 returns current statistics for the Nintendo Wii gaming console. The current statistics include values, such as, a minimum selling price 412, a maximum selling price 414, an average selling price 416, a median selling price 418, a minimum shipping cost 420, and an average Buy It Now! price 422. Additionally, the current statistics may include pie charts, such as, an immediate payment availability chart 424, a best offer availability chart 426, a Buy It Now! availability chart 428, a listing types used chart 430 (shown in FIG. 4c), and a shipping method used chart 432 (shown in FIG. 4c). It should be noted that other statistics, alternatively, less statistics may be determined and displayed on the list assist UI 400.

Figure 4C:
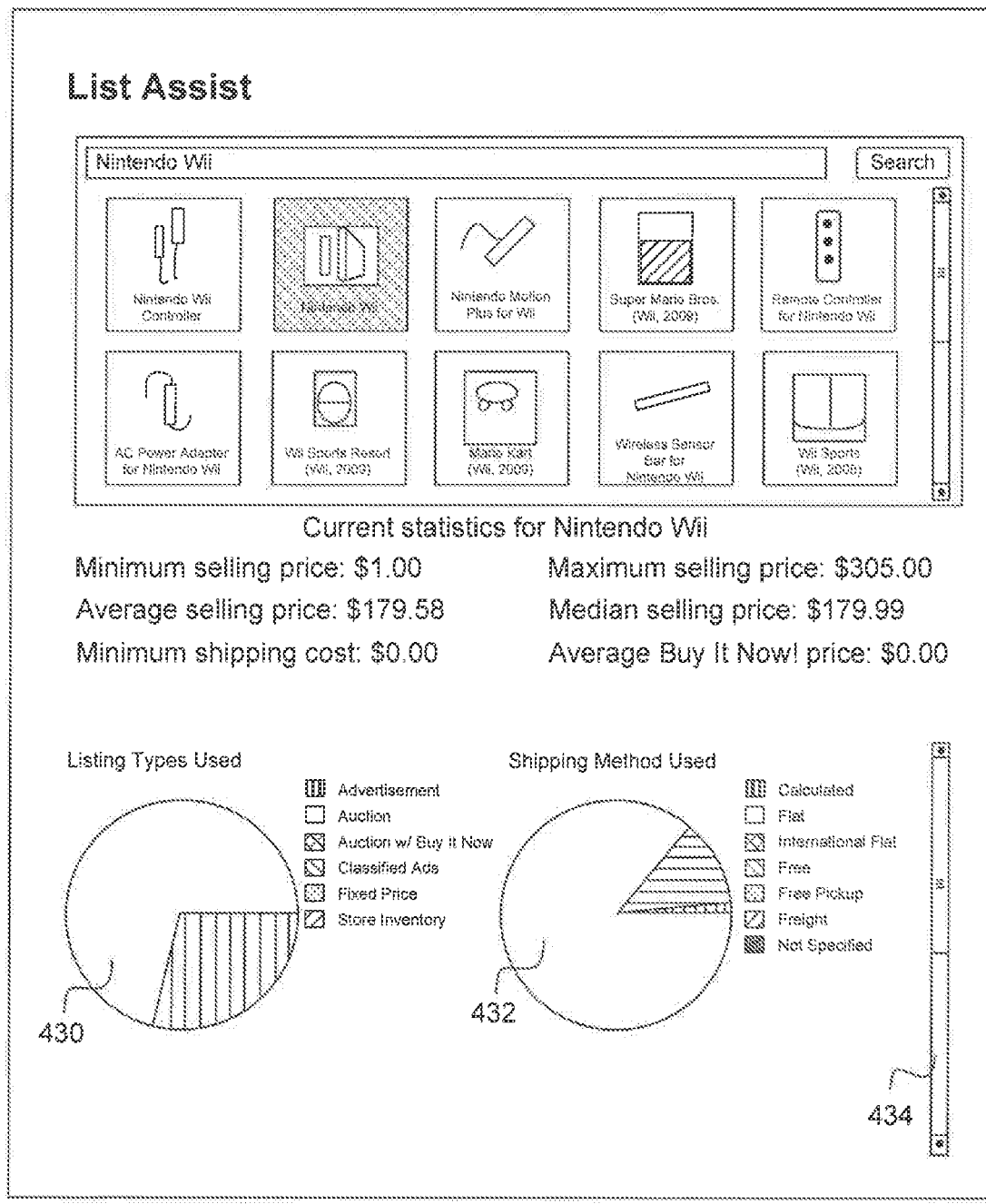
Figure 4D:
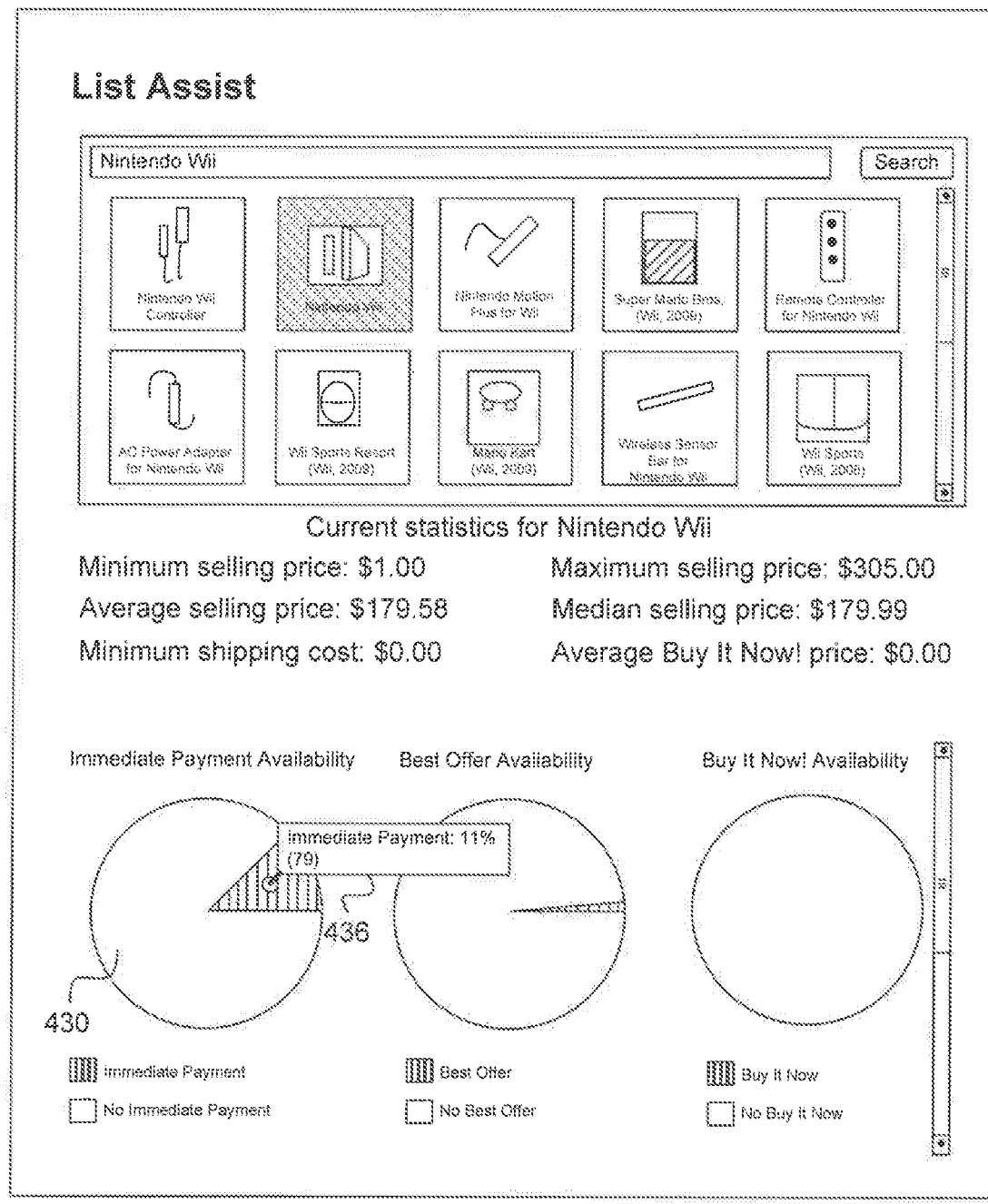

With embodiments displaying a large number of pie charts, the pie charts may be displayed in a scrollable format. For example, the immediate payment availability chart 424, the best offer availability chart 426, and the Buy It Now! availability chart 428 are shown in FIG. 4b in the statistics portion 410. Upon using a scroll bar 434, the listing types used chart 430 and the shipping method used chart 432 will become visible in the statistics portion 410 as shown in FIG. 4c. Alternative embodiments may display all the statistics on a single page or use other display mechanisms and styles to present the statistics.

The user may hover over any section of a pie chart and a data tip will pop up giving the user more detailed information. For example and referring to FIG. 4d, when the user hovers over the immediate payment availability chart 424, a data tip 436 is displayed. The data tip 436 indicates a percentage of listings (e.g., 11%) and a number of listings (e.g., 79) that offer an immediate payment option.

Using the information presented in the list assist UI 400, the user can infer how to price their items on the publication system. For example and based on the information presented in FIG. 4, the user can determine that a majority of the auctions for the Nintendo Wii gaming console do not provide immediate payment, best offer, or Buy It Now! options. Thus, the user may decide to list their Nintendo Wii gaming console without any of these options since other listings do not use these options. Alternatively, the user may decide to use one or more of these options in order to distinguish their listing from the majority of the listings on the publication system 120. Thus, the information presented in the list assist UI 400 aids the user in their decision making for how to price and list their item on the publication system 120.

Figure 5:
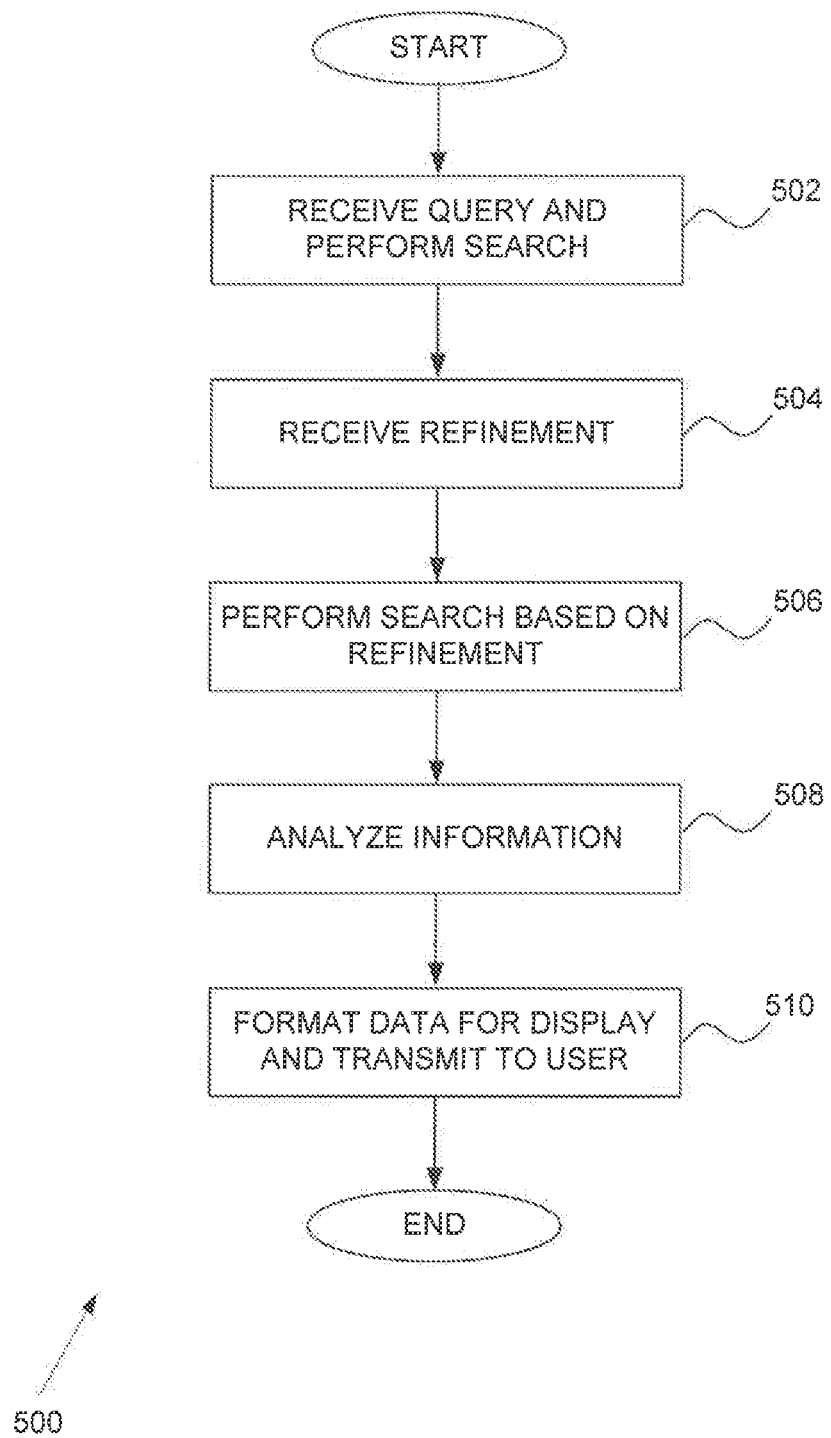
FIG. 5 is a flow diagram of an example high-level method for providing listing assistance.

FIG. 5 is a flow diagram of an example high-level method 500 for providing listing assistance. In example embodiments, the operations of the method 500 are performed at the publication system 120 (e.g., list assist engine 212). In operation 502, a query is received from a user at the client device 110 by the search item module 302. The query may comprise one or more keywords directed to an item of interest mat the user wants to list in a publication. Using the keywords, the search item module 302 performs a search of the database 126 for product categories that match the query. The resulting product category list may be formatted (e.g., XML) and returned to the client device 110.

In operation 504, a refinement request is received from the client device 110 by the retrieve data module 304. The refinement request comprises a product ID or product ID type corresponding to one of the product categories returned in the product category list of operation 502. The refinement request identifies a particular product category for which the user wants listing assistance data.

In operation 506, a search is performed using the product ID or product ID type by the retrieve data module 304. In example embodiments, the retrieve data module 304 retrieves information for current listings of the publication system 120 that correspond to (e.g., match) the product ID or product ID type.

The retrieved information is analyzed in operation 508 by the analysis module 308. By analyzing the retrieved information, the analysis module 308 determines current statistics of listings on the publication system 102. Operation 508 will be discussed in more detail in connection with FIG. 6 below.

The results of the analysis is formatted and transmitted to the user in operation 510. In one embodiment, the format module 310 formats the results into a JSON format for transmission to the client device 110. Alternative embodiments may contemplate the use of other formats based on requirements of the application rendering the user interface at the client device 110.

Figure 6:
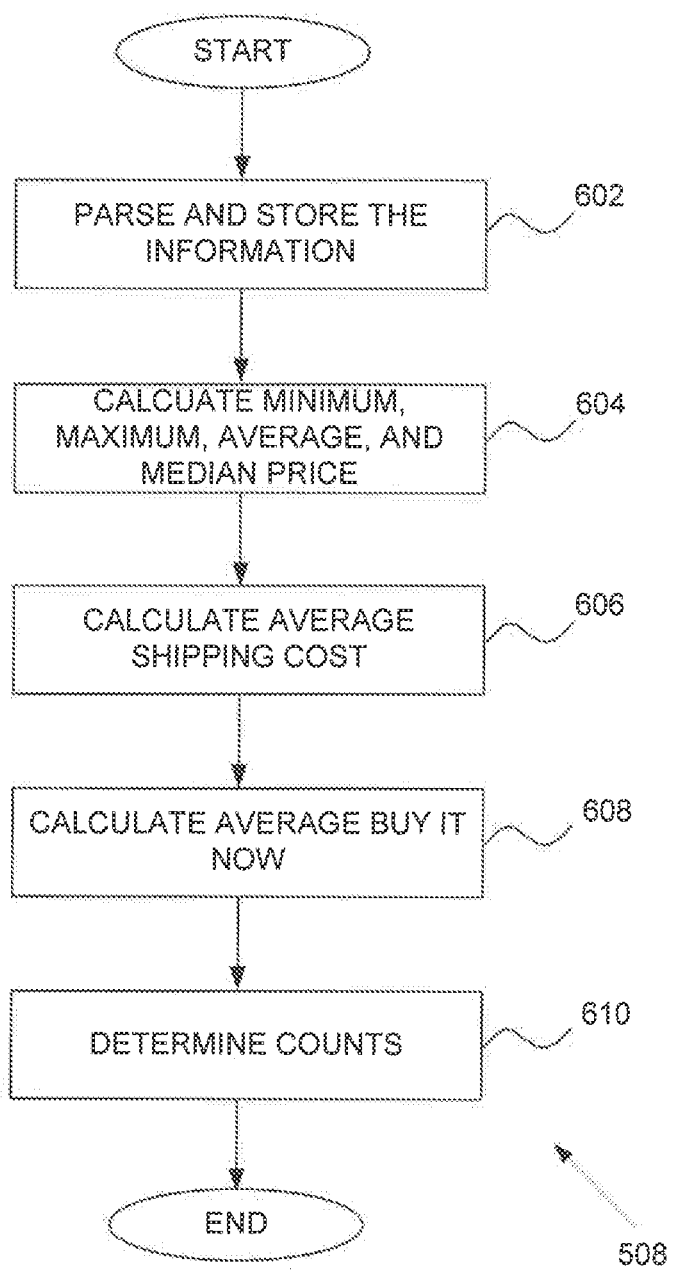
FIG. 6 is a flow diagram of an example detailed method for performing analysis in order to provide the listing assistance.

FIG. 6 is a flow diagram of an example detailed method (e.g., operation 508) for performing analysis in order to provide listing assistance. In operation 602, the retrieved information of operation 506 may be stored and parsed by the store module 306. In some embodiments, the retrieved information may be received in a paginated format. As such, the store module 306 stores the item listings that are retrieved in the paginated form and parses the information for each individual item listings from the pages.

In operation 604, values may be calculated based on information for each of the item listings by the analysis module 308. In example embodiments, the analysis module 308 calculates one or more of a minimum selling price, a maximum selling price, an average selling price, and a median selling price. The analysis module 308 may also calculate an average shipping cost in operation 606 and an average Buy It Now price in operation 608.

In operation 610, the analysis module 308 also determines counts based on the information from the individual listings. The counts may include, for example, number of immediate and non-immediate payment listings, number of best offer and non-best offer listings, number of Buy It Now and non-Buy It Now listings, numbers of different listing types (e.g., advertisement, auctions, auctions with Buy It Now, classified ads, fixed price, or store inventory) and numbers of different shipping methods used (e.g., calculated, flat, international, free, free pickup, freight, or not specified). It is noted that the analysis module 308 may calculate or determine other values and counts.

While example embodiments of the listing assistance method are presented in FIG. 5 and FIG. 6, alternative embodiments may be contemplated that perform the operations of the method in a different order, make some operations optional, combine operations, or delete operations.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 7:
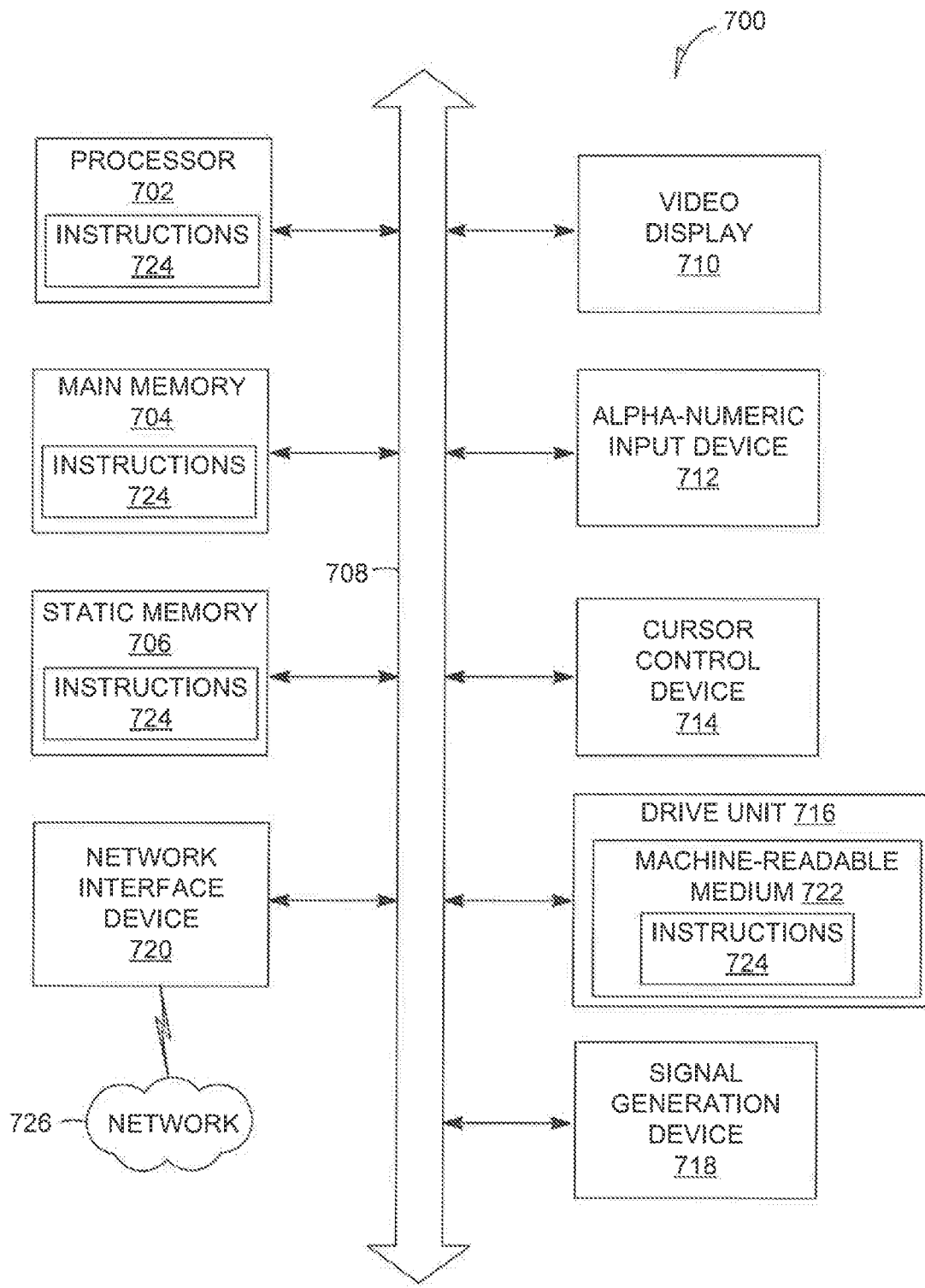
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable media.

While the machine-readable storage medium 722 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EE- PROM), and flash memory devices); magnetic disks such as internal hard disks and removable disks; magneto-optical disks; and CD-ROM and DVD-ROM disks.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:
    receiving user input from a user device, the user input describing information about a publication for listing on a network-based marketplace;
    retrieving a plurality of publications by querying a publication database based on the user input;
    generating statistic data using information from the plurality of publications by determining a minimum price and a maximum price from the plurality of publications and calculating information from the plurality of publications, wherein the information comprises counts of a plurality of different listing formats of the plurality publications used to generate the statistic data; and
    providing the statistic data including the minimum price, the maximum price, and the calculated information to the user device to display on a user interface.

2. The method of claim 1, wherein the information includes one or more keywords.

3. The method of claim 1, wherein the information comprises a product category.

4. The method of claim 1, wherein the information comprises a product identifier or product identifier type.

5. The method of claim 1, wherein the calculated information comprises a calculated price.

6. The method of claim 5, wherein the calculated price comprises an average price or a median price.

7. The method of claim 1, wherein the calculated information comprises an average shipping cost.

8. The method of claim 1, wherein generating statistic data further comprises determining a count of the publications.

9. One or more computer storage media storing computer-usable instructions that, when used by one or more computing devices, cause the one or more computing devices to perform operations comprising:
    providing, to a user device of a user, a first user interface;
    receiving, in the first user interface, information for generating an item listing for publication by a network-based publication system;
    identifying an item from the item listing being generated by the user;
    identifying, from a database of the network-based publication system, a plurality of item listings for items matching or similar to the item from the item listing being generated;
    generating a calculated price based on pricing information from the plurality of item listings, wherein the pricing information comprises counts of a plurality of different listing formats of the plurality of item listings; and
    providing, to the user device, a second user interface that presents the calculated price.

10. The computer storage media of claim 9, wherein the item from the item listing being generated is identified based on a product identifier or product identifier type.

11. The computer storage media of claim 9, wherein the calculated price comprises an average price or a median price.

12. The one or more computer storage media of claim 9, wherein the operations further comprise calculating an average shipping cost based on the plurality of item listings, and wherein the second user interface includes the average shipping cost in addition to the calculated price.

13. The one or more computer storage media of claim 9, wherein the operations further comprise determining a count of the item listings, and wherein the second user interface includes the count in addition to the calculated price.

14. The one or more computer storage media of claim 9, wherein the operations further comprise determining a minimum price and a maximum price based on the plurality of item listings, and wherein the second user interface includes the minimum price and the maximum price in addition to the calculated price.

15. The one or more computer storage media of claim 9, wherein providing the second user interface to the user device comprises updating the first user interface with the calculated price.

16. The one or more computer storage media of claim 9, wherein the second user interface allows the user to set a price for the item listing being generated.

17. A computer system comprising:
one or more processors; and
one or more computer storage media storing computer-usable instructions that, when used by the one or more processors, cause the one or more processors to:
receive user input from a user device, the user input including information for identifying an item or item category corresponding to an item listing being generated for publication by a network-based publication system;
in response to receiving the information, querying a database of the network-based publication system to retrieve a plurality of item listings for items corresponding to the item or item category;
generate a calculated price based on pricing information from the plurality of item listings, wherein the pricing information comprises counts of a plurality of different listing formats of the plurality of item listings; and
provide, to the user device, the calculated price for setting a price for the item listing being generated.

18. The computer system of claim 17, wherein the calculated price comprises an average price or a median price.

19. The computer system of claim 17, wherein the computer-usable instructions further cause the one or more processors to: determine a count of the item listings, and provide the count to the user device in addition to the calculated price.

20. The computer system of claim 17, wherein the computer-usable instructions further cause the one or more processors to: determine a minimum price and a maximum price based on the plurality of item listings, and provide the minimum price and the maximum price in addition to the calculated price.

* * * * *

UNITED STATES PATENT AND TRADEMARK OFFICE
CERTIFICATE OF CORRECTION

PATENT NO. : 10,853,852 B2
APPLICATION NO. : 15/913627
DATED : December 1, 2020
INVENTOR(S) : Neelakantan Sundaresan et al.

Page 1 of 1

It is certified that error appears in the above-identified patent and that said Letters Patent is hereby corrected as shown below:

In the Claims

In Column 11, Line 58, in Claim 1, delete "method" and insert -- method, -- therefor.

In Column 12, Line 2, in Claim 1, after "the plurality" insert -- of --.

In Column 12, Line 26, in Claim 9, delete "operations" and insert -- operations, -- therefor.

In Column 13, Line 4, in Claim 17, delete "system" and insert -- system, -- therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*